(12) United States Patent
McCrary et al.

(10) Patent No.: US 9,518,214 B2
(45) Date of Patent: Dec. 13, 2016

(54) PROPPANT WITH POLYUREA-TYPE COATING

(71) Applicant: Preferred Technology, LLC, Radnor, PA (US)

(72) Inventors: Avis Lloyd McCrary, Montgomery, TX (US); Robert Ray McDaniel, Cypress, TX (US); Ralph Edward Barthel, Wake Forest, NC (US); Spyridon Monastiriotis, Dallas, TX (US)

(73) Assignee: Preferred Technology, LLC, Radnor, PA (US)

( * ) Notice: Subject to any disclaimer, the term of this patent is extended or adjusted under 35 U.S.C. 154(b) by 0 days.

(21) Appl. No.: 13/837,396

(22) Filed: Mar. 15, 2013

(65) Prior Publication Data

US 2014/0274819 A1  Sep. 18, 2014

(51) Int. Cl.
C09K 8/80 (2006.01)

(52) U.S. Cl.
CPC ................................. C09K 8/805 (2013.01)

(58) Field of Classification Search
USPC ........................................................ 507/219
See application file for complete search history.

(56) References Cited

U.S. PATENT DOCUMENTS

| | | |
|---|---|---|
| 2,163,972 A | 6/1939 | Anderson |
| 2,366,007 A | 12/1944 | D'Alelio |
| 2,653,089 A | 9/1953 | Bulson |
| 2,823,753 A | 2/1958 | Henderson |
| 3,026,938 A | 9/1958 | Huitt |
| 3,392,148 A | 7/1968 | Hunter |
| 3,763,072 A | 10/1973 | Krieger |
| 3,805,531 A | 4/1974 | Kistner |
| 3,817,939 A | 6/1974 | Allen et al. |
| 3,837,892 A | 9/1974 | Marzocchi |
| 3,900,611 A | 8/1975 | Corbett et al. |
| 3,929,191 A | 12/1975 | Graham |
| 3,931,428 A | 1/1976 | Reick |
| 3,971,751 A | 7/1976 | Isayama et al. |
| 3,976,135 A | 8/1976 | Anderson |
| 4,074,760 A | 2/1978 | Copeland |
| 4,113,014 A | 9/1978 | Kubens |
| 4,177,228 A | 12/1979 | Prolss |
| 4,199,484 A | 4/1980 | Murphey |
| 4,252,655 A | 2/1981 | Carney |
| 4,273,910 A | 6/1981 | Lederer |
| 4,417,992 A | 11/1983 | Bhattacharyya et al. |
| 4,443,347 A | 4/1984 | Underdown |
| 4,465,815 A | 8/1984 | Chattha |
| 4,493,875 A | 1/1985 | Beck et al. |
| 4,518,039 A | 5/1985 | Graham |
| 4,554,188 A | 11/1985 | Holubka et al. |
| 4,585,064 A | 4/1986 | Graham et al. |
| 4,592,931 A | 6/1986 | Cargle |
| 4,594,268 A | 6/1986 | Kirwin |
| 4,732,920 A | 3/1988 | Graham et al. |
| 4,746,543 A | 5/1988 | Zinkan et al. |
| 4,785,884 A | 11/1988 | Armbruster |
| 4,792,262 A | 12/1988 | Kapps et al. |
| 4,801,635 A | 1/1989 | Zinkan et al. |
| 4,822,425 A | 4/1989 | Burch |
| 4,920,192 A | 4/1990 | Wiser-Halladay |
| 5,048,608 A | 9/1991 | Wiser-Halladay |
| 5,092,404 A | 3/1992 | Falk et al. |
| 5,138,055 A | 8/1992 | Parekh |
| 5,181,957 A | 1/1993 | Gross et al. |
| 5,188,175 A | 2/1993 | Sweet |
| 5,194,174 A | 3/1993 | Roe et al. |
| 5,199,491 A | 4/1993 | Kutta |
| 5,218,038 A | 6/1993 | Johnson et al. |
| 5,242,248 A | 9/1993 | Bramwell |
| 5,256,729 A | 10/1993 | Kutta |
| 5,264,572 A | 11/1993 | Endo et al. |
| 5,330,836 A | 7/1994 | Buese et al. |

(Continued)

FOREIGN PATENT DOCUMENTS

| | | |
|---|---|---|
| EP | 2469020 A1 | 6/2012 |
| GB | 1294017 A | 10/1972 |

(Continued)

OTHER PUBLICATIONS

The removal of heavy metal cations by natural zeolites, http://www.resultsrna.com/research/zeolite_binds_heavy_metals.php, pp. 3-7.

Wingenfelder, Ulla et al., Removal of Heavy Metals from Mine Waters by Natural Zeolites, Environ. Sci. Technol., 2005, vol. 39, 4606-4613.

Halimoon, Normala, Removal of Heavy Metals from Textile Wastewater Using Zeolite, EnvironmentAsia 3(special issue) 2010, 124-130.

Wikipedia, Methylene diphenyl diisocyanate, http://en.wikipedia.org/wiki/Methylene_diphenyl_diisocyanate.

CARBO Ceramics, Topical Reference, Physical Properties of Proppants, pp. 1-5.

Huntsman, Performance products JEFFCAT catalysts for the Polyurethane Industry—Asia-Pacific, pp. 1-6.

Huntsman, JEFFCAT Amine Catalysts for the Polyurethane Industry—Americas Region.

(Continued)

Primary Examiner — Jeffrey Washville
(74) Attorney, Agent, or Firm — Pepper Hamilton LLP

(57) ABSTRACT

Proppants for hydraulic fracturing of oil and gas wells are coated with a polyurea-type coating. In a preferred embodiment, the polyurea-type coating is formed by contacting a polymeric isocyanate with an amount of water and a blowing catalyst at a rate and quantity sufficient to generate a reactive amine in situ on the outer surface of the proppant which thereby reacts with unconverted polymeric isocyanate to form a thin polyurea-type surface coating that is substantially solid and lacks foam or substantial porosity. Alternatively, the polyurea-type can be produced by selecting reactive amine compounds and isocyanates to develop the coated proppant. The coated proppants retain the discrete, free-flowing character of the original core solids but with the beneficial effects of the polyurea-type coating of the present invention.

15 Claims, No Drawings

(56) References Cited

U.S. PATENT DOCUMENTS

| | | |
|---|---|---|
| 5,420,174 A | 5/1995 | Dewprashad |
| 5,422,183 A | 6/1995 | Sinclair et al. |
| 5,480,584 A | 1/1996 | Urano et al. |
| 5,582,249 A | 12/1996 | Caveny |
| 5,597,784 A | 1/1997 | Sinclair et al. |
| 5,721,315 A | 2/1998 | Evans |
| 5,733,952 A | 3/1998 | Geoffrey |
| 5,824,462 A | 10/1998 | Ashida et al. |
| 5,837,656 A | 11/1998 | Sinclair et al. |
| 5,849,818 A | 12/1998 | Walles et al. |
| 5,856,271 A | 1/1999 | Cataldo et al. |
| 5,911,876 A | 6/1999 | Rose |
| 5,924,488 A | 7/1999 | Nguyen |
| 5,955,144 A | 9/1999 | Sinclair et al. |
| 6,071,990 A | 6/2000 | Yip et al. |
| 6,079,492 A | 6/2000 | Hoogteijling |
| 6,093,469 A | 7/2000 | Callas |
| 6,093,496 A | 7/2000 | Dominguez et al. |
| 6,114,410 A | 9/2000 | Betzold |
| 6,127,308 A | 10/2000 | Slack et al. |
| 6,187,892 B1 | 2/2001 | Markusch et al. |
| 6,207,766 B1 | 3/2001 | Doi et al. |
| 6,270,692 B1 | 8/2001 | Geissler et al. |
| 6,306,964 B1 | 10/2001 | Evans |
| 6,372,842 B1 | 4/2002 | Grisso et al. |
| 6,387,501 B1 | 5/2002 | McCrary |
| 6,406,789 B1 | 6/2002 | McDaniel |
| 6,486,287 B2 | 11/2002 | McGall et al. |
| 6,528,157 B1 | 3/2003 | Hussain |
| 6,582,819 B2 | 6/2003 | McDaniel |
| 6,632,527 B1 | 10/2003 | McDaniel et al. |
| 6,668,926 B2 | 12/2003 | Nguyen |
| 6,705,400 B1 | 3/2004 | Nguyen |
| 6,732,800 B2 | 5/2004 | Acock et al. |
| 6,767,978 B2 | 7/2004 | Aubart et al. |
| 6,790,245 B2 | 9/2004 | Wolff et al. |
| 6,809,149 B2 | 10/2004 | Meyer et al. |
| 6,866,099 B2 | 3/2005 | Nguyen |
| 7,012,043 B2 | 3/2006 | Klein |
| 7,074,257 B2 | 7/2006 | Lockwood et al. |
| 7,078,442 B2 | 7/2006 | Brown |
| 7,129,308 B2 | 10/2006 | McGall et al. |
| 7,135,231 B1 | 11/2006 | Sinclair |
| 7,153,575 B2 | 12/2006 | Anderson |
| 7,157,021 B2 | 1/2007 | Bytnar et al. |
| 7,216,711 B2 | 5/2007 | Nguyen |
| 7,244,492 B2 | 7/2007 | Sinclair et al. |
| 7,261,156 B2 | 8/2007 | Nguyen |
| 7,270,879 B2 | 9/2007 | McCrary |
| 7,281,581 B2 | 10/2007 | Nguyen |
| 7,318,472 B2 | 1/2008 | Smith |
| 7,318,474 B2 | 1/2008 | Welton |
| 7,322,411 B2 | 1/2008 | Brannon |
| 7,326,346 B2 | 2/2008 | Lovell et al. |
| 7,332,089 B2 | 2/2008 | Harjula et al. |
| 7,334,635 B2 | 2/2008 | Nguyen |
| 7,334,783 B2 | 2/2008 | Yoneyama et al. |
| 7,343,973 B2 | 3/2008 | Dusterhoft |
| 7,344,783 B2 | 3/2008 | Shea |
| 7,350,571 B2 | 4/2008 | Nguyen |
| 7,407,010 B2 | 8/2008 | Rickman |
| 7,528,096 B2 | 5/2009 | Brannon |
| 7,537,702 B2 | 5/2009 | Lupton et al. |
| 7,624,802 B2 | 12/2009 | McCrary |
| 7,678,872 B2 | 3/2010 | Glass et al. |
| 7,721,804 B2 | 5/2010 | Duenckel |
| 7,726,399 B2 | 6/2010 | Brannon |
| 7,754,659 B2 | 7/2010 | Rediger |
| 7,772,163 B1 | 8/2010 | Brannon |
| 7,789,147 B2 | 9/2010 | Brannon |
| 7,803,742 B2 | 9/2010 | Bicerano et al. |
| 7,884,043 B2 | 2/2011 | Lisetskiy et al. |
| 7,896,080 B1 | 3/2011 | Watters et al. |
| 7,919,183 B2 | 4/2011 | McDaniel |
| 7,921,910 B2 | 4/2011 | Wilson et al. |
| 7,999,013 B2 | 8/2011 | Brown |
| 8,006,754 B2 | 8/2011 | Bicerano |
| 8,006,755 B2 | 8/2011 | Bicerano |
| 8,052,890 B2 | 11/2011 | Nguyen |
| 8,133,587 B2 | 3/2012 | Rediger et al. |
| 8,183,179 B2 | 5/2012 | Garcia-Lopez De Victoria et al. |
| 8,258,206 B2 | 9/2012 | Kanagasabapathy et al. |
| 8,298,667 B2 | 10/2012 | Smith et al. |
| 8,338,351 B2 | 12/2012 | Kanagasabapathy et al. |
| 8,349,911 B2 | 1/2013 | Kuehnle |
| 8,354,279 B2 | 1/2013 | Nguyen et al. |
| 8,360,149 B2 | 1/2013 | Hughes et al. |
| 8,431,220 B2 | 4/2013 | Wu et al. |
| 8,513,342 B2 | 8/2013 | Gao et al. |
| 8,763,700 B2 | 7/2014 | McDaniel et al. |
| 8,936,083 B2 | 1/2015 | Nguyen |
| 9,040,467 B2 | 5/2015 | McDaniel et al. |
| 2001/0014453 A1 | 8/2001 | McGall et al. |
| 2002/0048676 A1 | 4/2002 | McDaniel |
| 2003/0102128 A1 | 6/2003 | Dawson et al. |
| 2003/0131998 A1 | 7/2003 | Nguyen |
| 2003/0196805 A1 | 10/2003 | Boney et al. |
| 2003/0224165 A1 | 12/2003 | Anderson |
| 2004/0010267 A1 | 1/2004 | Nakamura et al. |
| 2004/0129923 A1 | 7/2004 | Nguyen et al. |
| 2004/0138343 A1 | 7/2004 | Campbell et al. |
| 2005/0018193 A1 | 1/2005 | Chilese et al. |
| 2005/0019574 A1 | 1/2005 | McCrary |
| 2005/0173116 A1 | 8/2005 | Nguyen et al. |
| 2005/0274523 A1 | 12/2005 | Brannon et al. |
| 2006/0035790 A1 | 2/2006 | Okell et al. |
| 2006/0073980 A1 | 4/2006 | Brannon et al. |
| 2006/0157243 A1 | 7/2006 | Nguyen |
| 2006/0241198 A1 | 10/2006 | Motz et al. |
| 2007/0021309 A1 | 1/2007 | Bicerano |
| 2007/0034373 A1 | 2/2007 | McDaniel |
| 2007/0036977 A1 | 2/2007 | Sinclair et al. |
| 2007/0066742 A1 | 3/2007 | Mhetar et al. |
| 2007/0073590 A1 | 3/2007 | Cosentino et al. |
| 2007/0088137 A1 | 4/2007 | Georgeau et al. |
| 2007/0161515 A1 | 7/2007 | Bicerano |
| 2007/0204992 A1 | 9/2007 | Davis |
| 2007/0208156 A1 | 9/2007 | Posey |
| 2007/0209794 A1 | 9/2007 | Kaufman |
| 2007/0215354 A1 | 9/2007 | Rickman |
| 2007/0228322 A1 | 10/2007 | Chaves et al. |
| 2007/0289781 A1 | 12/2007 | Rickman et al. |
| 2008/0011478 A1 | 1/2008 | Welton et al. |
| 2008/0063868 A1 | 3/2008 | Chung et al. |
| 2008/0202744 A1 | 8/2008 | Crews |
| 2008/0202750 A1* | 8/2008 | Rediger ............... C09K 8/805 166/280.2 |
| 2008/0230223 A1 | 9/2008 | McCrary |
| 2008/0236825 A1 | 10/2008 | Barmatov et al. |
| 2009/0044942 A1 | 2/2009 | Gupta |
| 2009/0238988 A1 | 9/2009 | McDaniel |
| 2010/0065271 A1 | 3/2010 | McCrary |
| 2010/0196621 A1 | 8/2010 | Larson-Smith et al. |
| 2010/0212898 A1 | 8/2010 | Nguyen et al. |
| 2010/0282462 A1 | 11/2010 | Xu et al. |
| 2010/0286000 A1 | 11/2010 | Huang |
| 2011/0024129 A1 | 2/2011 | Turakhia et al. |
| 2011/0053809 A1 | 3/2011 | Sanders et al. |
| 2011/0120719 A1 | 5/2011 | Soane et al. |
| 2011/0162837 A1 | 7/2011 | O'Malley |
| 2011/0244125 A1 | 10/2011 | Weisenberg |
| 2011/0272146 A1 | 11/2011 | Green |
| 2011/0297383 A1 | 12/2011 | Tanguay |
| 2012/0018162 A1 | 1/2012 | Tanguay |
| 2012/0277130 A1 | 11/2012 | Usova |
| 2012/0279703 A1 | 11/2012 | McDaniel et al. |
| 2012/0283153 A1 | 11/2012 | McDaniel et al. |
| 2012/0322925 A1 | 12/2012 | Arigo et al. |
| 2013/0005856 A1 | 1/2013 | Phonthammachai et al. |
| 2013/0037048 A1 | 2/2013 | Edgington et al. |
| 2013/0045901 A1 | 2/2013 | Bicerano |
| 2013/0048365 A1 | 2/2013 | Kim et al. |
| 2013/0065800 A1 | 3/2013 | McDaniel et al. |
| 2013/0081812 A1 | 4/2013 | Green et al. |

(56) References Cited

U.S. PATENT DOCUMENTS

| | | | |
|---|---|---|---|
| 2013/0164449 | A1 | 6/2013 | Tadepalli et al. |
| 2013/0184381 | A1 | 7/2013 | Bilodeau et al. |
| 2013/0186624 | A1 | 7/2013 | McCrary et al. |
| 2013/0203917 | A1 | 8/2013 | Harris et al. |
| 2013/0233545 | A1 | 9/2013 | Mahoney et al. |
| 2013/0312974 | A1 | 11/2013 | McClung, IV |
| 2014/0060826 | A1 | 3/2014 | Nguyen |
| 2014/0162911 | A1 | 6/2014 | Monastiriotis et al. |
| 2014/0262247 | A1 | 9/2014 | Duenckel et al. |
| 2014/0274819 | A1 | 9/2014 | McCrary et al. |
| 2014/0305650 | A1 | 10/2014 | Song et al. |

FOREIGN PATENT DOCUMENTS

| | | | |
|---|---|---|---|
| GB | 1412159 | * | 10/1975 |
| WO | 2005121272 | A1 | 12/2005 |
| WO | 2010/049467 | | 5/2010 |
| WO | 2013048365 | A1 | 4/2013 |
| WO | 2013112251 | A1 | 8/2013 |

OTHER PUBLICATIONS

Sanchez, Mariano, FRAC Packing: Fracturing for Sand Control, Middle East and Asia Reservoir Review, Nov. 8, 2007, pp. 37-49.
Interstate Oil and Gas Compact Commission and All Consulting, A Guide to Practical Management of Produced Water from Onshore Oil and Gas Operations in the United States, Oct. 2006.
Boster, Ronald S., A Study of Ground-Water Contamination Due to Oil-Field Brines in Morrow and Delaware Counties, Ohio, With Emphasis on Detection Utilizing Electrical Resistivity Techniques, The Ohio State University, 1967.
EPA, Oil and Gas Extraction, Compliance and Enforcement History, Sector Notebook Project, Oct. 2000, pp. 115-155.
Huntsman, The JEFFAMINE Polyetheramines, 2007.
Hui et al., Removal of mixed heavy metal ions in wastewater by zeolite 4A and residual products from recycled coal fly ash, Journal of Hazardous Materials, Aug. 1, 2005, vol. B127, pp. 89-101.
Cao et al., Mesoporous SiO2-supported Pt Nanoparticles for catalytic application, ISRN Nanomaterials, 2013, Article ID 745397, 7 pages.
Kuang et al., Controllable fabrication of SnO2-coated multiwalled carbon nanotubes by chemical vapor deposition, Carbon 2006 44(7):1166-1172.
Madaan and Tyagi, Quaternary pryidinium salts: a review, J Oleo Sci 2008 57(4):197-215.
Mellaerts et al., Enhanced release of itraconazole from ordered mesoporous SBA-15 silica materials, Chem Commun 2007 7(13):1375-7.
Notice of Allowance dated Dec. 22, 2015 in U.S. Appl. No. 13/626,055.
AkzoNobel Declaration of Compliance Bindzil CC401, Eka Chemical, Jan. 27, 2010, pp. 1-4.
AkzoNobel Silane Modified Colloidal Silca Bindzil CC in Waterborne Coating Applications Use and Benefits, 2011, pp. 1-6.
International Search Report and Written Opinion issued in PCT/US2012/036093 dated Aug. 14, 2012.
International Search Report and Written Opinion issued in PCT/US2012/047519 dated Nov. 2, 2012.
International Search Report and Written Opinion issued in PCT/US2012/053277 dated Nov. 20, 2012.
International Search Report issued in PCT/US2012/070844 dated Mar. 8, 2013.
Official Action datd Nov. 30, 2015 from U.S. Appl. No. 14/798,774.
Polyurethanes, Ullmann's Encyclopedia of Industrial Chemistry, 2012, vol. 29.
Wikipedia, ion-exchange resin, en.wikipedia.org/wikillon_exchange_resins, pp. 1-5.
Wikipedia, Piezoelectricity, en.wikipedia.org.wiki/Piezoelectricity, pp. 1-15.
Non-Final Office Action dated Mar. 18, 2016 in U.S. Appl. No. 13/355,969.
Non-Final Office Action dated Apr. 5, 2016 in U.S. Appl. No. 14/314,573.
Non-Final Office Action dated Apr. 5, 2016 in U.S. Appl. No. 13/897,288.
Final Office Action dated Apr. 29, 2016 in U.S. Appl. No. 14/798,774.
Final Office Action dated May 3, 2016 in U.S. Appl. No. 14/266,179.

* cited by examiner

PROPPANT WITH POLYUREA-TYPE COATING

FIELD OF INVENTION

The invention relates to a composition and method for the production of proppants having a polyurea-type coating.

BACKGROUND OF THE INVENTION

Coated proppants are often used in hydraulic well fracturing to increase production rate of the well. Recently, we have discovered that cured, commercially acceptable, coatings can be applied to proppants using the polyurethane reaction products of polyols and isocyanates. The details of these processes are disclosed in our co-pending U.S. patent application Ser. No. 13/099,893 (entitled "Coated and Cured Proppants"); Ser. No. 13/188,530 (entitled "Coated and Cured Proppants"); Ser. No. 13/626,055 (entitled "Coated and Cured Proppants"); Ser. No. 13/224,726 (entitled "Dual Function Proppants") and Ser. No. 13/13/355,969 (entitled "Manufacture of Polymer Coated Proppants"), the disclosures of which are herein incorporated by reference. Such polyurethane-based proppant coatings are economically and environmentally desirable for a number of reasons, all of which suggest that the development and use of such coating would be highly desirable.

Two other published patent applications discuss the use of isocyanates for proppant coatings. Tanguay et al. 2011/0297383 presents examples of high temperature proppant coatings made of a polycarbodiimide coating on sand. The coating is said to be made from the reaction of a monomeric isocyanate and a polymeric isocyanate. The catalyst is a phosphorous-based catalyst exemplified in example 1 by 3-methyl-1-phenyl-2-phospholene oxide.

Tanguay et al. 2012/0018162 relates to a polyamide imide proppant coating for high temperature applications. The examples have a description of the use of polymeric diphenylmethane diisocyanate, trimellitic anhydride, one of three different types of amines, triethylamine as a catalyst, an adhesion promoter and a wetting agent. The coating/reaction process described lasts about 10 minutes followed by a post-cure heating of 1-3 hours.

The commercial "standard" coatings are typically a form of phenolic thermoset coating. Partially cured phenolic proppants are typically used in low temperature wells (i.e., those having bottom hole temperature of less than about 150° F. (66° C.)) which typically exhibit low crack closure stresses (e.g., 2000-6000 psi). The theory behind their use is that the residual reactivity of the partially cured phenolic coating in the context of heated water found in most wells will permit the coating to soften and flow, thereby allowing the proppants to consolidate and form interparticle bonds during the "shut-in" period. The high temperature of the downhole conditions is supposed to complete the curing reactions in situ in the propped formation. An activator fluid is used to soften the outer surface of these precured proppants in an effort to encourage consolidation and interparticle bonding. The activator itself raises, however, additional issues of compatibility with the fracturing and breaker fluids as well as the possibility of adverse effects on the continued conductivity of the fractured strata.

For high temperature wells, such as those with a bottom hole temperature above about 200° F. (93° C.), precured phenolic coatings are often used. The high crack closure stresses are often above 6,000 psi are used as the main mechanism for holding proppant within the cracked strata.

In practice, however, a variety of factors can adversely affect the performance and usefulness of the precured, phenolic coatings. The most important of these is premature curing of the partially cured phenolic resin in the coating due to exposure to high temperatures before introduction into the fractured strata. Even the elevated, above-ground, temperatures found on loading docks and in shipping containers can be enough to effect curing of the coating long before it is desirable.

Thus, there exists a need in the industry for a proppant coating that can be used in high temperature wells that will form interparticle bond strength at the expected downhole temperature and pressure conditions yet will not be compromised in forming such interparticle bond strength by premature exposure to elevated or high temperatures.

SUMMARY OF THE INVENTION

The present invention provides a proppant core having a polyurea-type coating thereon that is useful for propping open the cracks formed during hydraulic fracturing of subterranean formations, such as oil and gas well strata, in deep wells or those exhibiting high temperature (e.g., above about 200° F.) and high pressure (e.g., above about 5000 psi).

More specifically, the present invention comprises a coated proppant and its method of production that comprises forming a thin film of a substantially foam-free, polyurea-type coating on a proppant core solid by contacting said core with a reacting mixture that comprises a polymeric isocyanate, water and a blowing catalyst. The controlled rate of addition of water in contact with the polymeric isocyanate allows the water to form a reactive amine species from the polymeric isocyanate which then reacts with unconverted polymeric isocyanate to form the desired polyurea, biuret, and/or triuret-type coating (generally referred to herein as a "polyurea-type" coating) directly on the outer surface of the proppant solid.

The polyurea-type coated proppant according to the invention shows good coating weight, high crush resistance, good bond strength, and results with a thermomechanical analyzer (TMA) indicating properties like that of a precured, phenolic resin proppant coating but with the ability to form interparticle bond strength as determined by a standard unconfined compressive strength (UCS) test without the need for or use of an added activator or surfactant that might artificially soften the outer surface of the polyurea-type coating or otherwise present compatibility issues with fracturing or breaker fluids or long term conductivity of the fractured strata. Such a coating is well suited for use in propping open the cracks formed by hydraulic fracturing of high temperature subterranean formations, such as deep oil and gas wells where good conductivity for extended periods is highly desirable.

DETAILED DESCRIPTION OF THE INVENTION

As noted above, the present invention comprises a polyurea-coated proppant and its method of production. The polyurea-type coating is formed as a thin film of a substantially foam-free, polyurea-type polymer that is formed directly on the proppant core solid, optionally enhanced by pretreatment of the proppant core surface with a bonding agent. One or more flow aids or anticaking agents can be added to the finished proppants to reduce dusting, caking and forming agglomerates despite the ambient humidity level and environmental conditions.

The polyurea-type coatings of the present invention are unique in many respects. The most important of these is in the ability to generate interparticle bond strength between other proppants having the coating of the present invention under the temperature and stress of downhole conditions. Unlike conventional proppant coatings, this interparticle bonding capability of the present invention is substantially unaffected by premature exposure to heat, even for extended periods. Conventional curable coatings are vulnerable to premature exposure to elevated temperatures for any substantial period of time (e.g., 2-3 hours at 100° C.) prior to coming into contact with other particles and being subjected to a substantial closure stress. Once the conventional coating finishes its curing (where and whenever this occurs) it no longer has the possibility to create particle to particle bonding. The coatings of the present invention do not suffer such a vulnerability. The coating of the invention seems to act as a thermoplastic adhesive that is dry, non-tacky and substantially cured after manufacture yet it can develop appreciable proppant-to-proppant bond strength under downhole conditions that help retain conductivity with control over flowback.

Although the specific mechanism by which this interparticle bond strength is formed is not fully understood, it appears to be the result of a combination of mechanical and chemical effects on a polymer that acts like a thermoplastic under the conditions prevailing downhole in high temperature wells. This may help to explain why phenolic coatings, due potentially to their apparent curing mechanism like thermoset polymers, do not seem to act under downhole conditions like the polyurea-type coatings of the present invention or, for that matter, the non-phenolic polyurethane coatings that are described in the copending applications noted above, under similar conditions.

Tests on the coating to determine its glass transition temperature (Tg) as well as laboratory-scale tests for bond strength, such as conventional UCS testing, or conductivity can be used to evaluate the suitability of any particular coating formulation that has been prepared by a particular coating method. In particular, the Tg can be used as a guide to foretell whether a thermoplastic coating (such as those of the present invention, the polyurethanes described by our copending patent applications that were noted above and incorporated by reference, or those of the previously noted Tanguay et al. patent applications) are potentially useable in the downhole conditions of a given fractured stratum. It is desirable that the Tg of the proppant coating be a temperature that is less than that prevailing downhole so that the thermoplastic coating has the ability to soften under prevailing combination of temperature and pressure. For the present invention and for use in high temperature well, the Tg of the polyurea-type coating is preferably greater than about 175° C. but less than about 300° C. and even more preferably within the range from about 200-265° C. For lower temperature wells, those with downhole temperatures within the range of 125°-250° F., most often within a range of about 150°-200° F., the Tg of the polyurea-type coating is desirably within the range of about 40° C. to 100° C.

A preferred testing method for proppant performance is described in ISO 13503-5:2006(E) "Procedures for measuring the long term conductivity of proppants", the disclosure of which is herein incorporated by reference. The ISO 13503-5:2006 provides standard testing procedures for evaluating proppants used in hydraulic fracturing and gravel packing operations. ISO 13503-5:2006 provides a consistent methodology for testing performed on hydraulic fracturing and/or gravel packing proppants. The "proppants" mentioned henceforth in this part of ISO 13503-5:2006 refer to sand, ceramic media, resin-coated proppants, gravel packing media, and other materials used for hydraulic fracturing and gravel-packing operations. ISO 13503-5:2006 is not applicable for use in obtaining absolute values of proppant pack conductivities under downhole reservoir conditions, but it does serve as a consistent method by which such downhole conditions can be simulated and compared in a laboratory setting.

The polyurea-type coating is preferably formed on the proppant from a dynamically reacting mixture that comprises an isocyanate, water and a curing agent (preferably an aqueous solution containing a curing agent or catalyst) that have been simultaneous contacted and mixed in the presence of the proppant core. While not wishing to be bound by theory of operation, the controlled rates of substantially simultaneous water and isocyanate are believed to allow the water to form a reactive amine species from the isocyanate, which newly-formed amine then reacts with other, unconverted isocyanate to form the desired polyurea-type coating directly on the outer surface of the proppant solid. Thus, the simultaneous contact among the ingredients forms a reacting mixture that polymerizes to form a thin, hard, substantially foam-free coating directly on the outer surface of the proppant core. If the sand has been heated in advance of the contact, the reaction can proceed substantially to completion in less than about four minutes to form a hard, substantially fully-cured coating that does not require post-curing to form a tack-free or substantially tack-free outer surface.

Alternatively and less preferably, a polyurea-type coating can be formed on the proppant core by serially adding polyurea-type precursor components to the mixer. Such a process would likely need, however, sufficient agitation and mixing to avoid boundary layer effects from the first-added component that would cover the surface of the proppant core to a certain depth which might inhibit a complete reaction of all of the first material down to the surface of the proppant core solid. Sufficient agitation would be used to force the second component into the boundary layer of first component so that the first component boundary layer reacts downwardly from its outer surface towards the outer surface of the proppant core to form linkages that are tightly adhered to the proppant core surface.

Similar concerns would occur if the proppant core had been stored under external conditions and had become wet. It would be desirable to heat the proppant core above about 100° C., possibly less with moving air through the solids, until the proppants are substantially dry before they are first contacted with a reactable or reacting mixture of polyurea-type precursors. Such a drying process is commonly used in processing even uncoated sand proppants, the present coating process is preferably performed in the same or adjacent facility as the drying operation so that the sensible heat introduced to the sand for drying can also be used to facilitate the formation of cured coatings on at least a portion of the processed proppant sands.

The Isocyanate Component

The isocyanate-functional component for the present invention comprises an isocyanate-functional component with at least 2 reactive isocyanate groups. Other isocyanate-containing compounds may be used, if desired. Examples of suitable isocyanate with at least 2 isocyanate groups an aliphatic or an aromatic isocyanate with at least 2 isocyanate groups (e.g. a diisocyanate, triisocyanate or tetraisocyanate), or an oligomer or a polymer thereof can preferably be used.

These isocyanates with at least 2 isocyanate groups can also be carbocyclic or heterocyclic and/or contain one or more heterocyclic groups.

The isocyanate-functional component with at least 2 isocyanate groups is preferably a compound, polymer or oligomer of compounds of the formula (III) or a compound of the formula (IV):

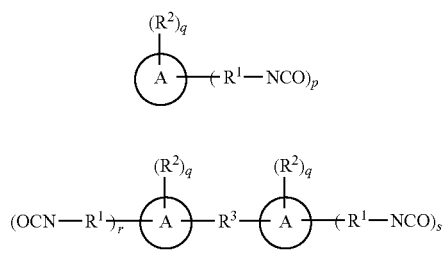

In the formulas (III) and (IV), A is each, independently, an aryl, heteroaryl, cycloalkyl or heterocycloalkyl. Preferably, A is each, independently, an aryl or cycloalkyl. More preferably A is each, independently, an aryl which is preferably phenyl, naphthyl or anthracenyl, and most preferably phenyl. Still more preferably A is a phenyl.

The above mentioned heteroaryl is preferably a heteroaryl with 5 or 6 ring atoms, of which 1, 2 or 3 ring atoms are each, independently, an oxygen, sulfur or nitrogen atom and the other ring atoms are carbon atoms. More preferably the heteroaryl is selected among pyridinyl, thienyl, furyl, pyrrolyl, imidazolyl, pyrazolyl, pyrazinyl, pyrimidinyl, pyridazinyl, oxazolyl, isoxazolyl or furazanyl.

The above mentioned cycloalkyl is preferably a $C_{3-10}$-cycloalkyl, more preferably a $C_{5-7}$-cycloalkyl.

The above mentioned heterocycloalkyl is preferably a heterocycloalkyl with 3 to 10 ring atoms (more preferably with 5 to 7 ring atoms), of which one or more (e.g. 1, 2 or 3) ring atoms are each, independently, an oxygen, sulfur or nitrogen atom and the other ring atoms are carbon atoms. More preferably the heterocycloalkyl is selected from among tetrahydrofuranyl, piperidinyl, piperazinyl, aziridinyl, acetidinyl, pyrrolidinyl, imidazolidinyl, morpholinyl, pyrazolidinyl, tetrahydrothienyl, octahydroquinolinyl, octahydroisoquinolinyl, oxazolidinyl or isoxazolidinyl. Still more preferably, the heterocycloalkyl is selected from among tetrahydrofuranyl, piperidinyl, piperazinyl, pyrrolidinyl, imidazolidinyl, morpholinyl, pyrazolidinyl, tetrahydrothienyl, oxazolidinyl or isoxazolidinyl.

In the formulas (III) and (IV), each $R^1$ is, independently, a covalent bond or $C_{1-4}$-alkylene (e.g. methylene, ethylene, propylene or butylene). Preferably each $R^2$ is hydrogen or a covalent bond.

In the formulas (III) and (IV), each $R^2$ is each, independently, hydrogen, a halogen (e.g. F, Cl, Br or I), a $C_{1-4}$-alkyl (e.g. methyl, ethyl, propyl or butyl) or $C_{1-4}$-alkyoxy (e.g. methoxy, ethoxy, propoxy or butoxy). Preferably, each $R^2$ is, independently, hydrogen or a $C_{1-4}$-alkyl. More preferably each $R^2$ is hydrogen or methyl.

In the formula (IV), $R^3$ is a covalent bond, a $C_{1-4}$-alkylene (e.g. methylene, ethylene, propylene or butylene) or a group —$(CH_2)_{R31}$—O—$(CH_2)_{R32}$—, wherein R31 and R32 are each, independently, 0, 1, 2 or 3. Preferably, $R^3$ is a —$CH_2$— group or an —O— group.

In the formula (III), p is equal to 2, 3 or 4, preferably 2 or 3, more preferably 2.

In the formulas (III) and (IV), each q is, independently, an integer from 0 to 4, preferably 0, 1 or 2. When q is equal to 0, the corresponding group A has no substituent $R^2$, but has hydrogen atoms instead of $R^2$.

In the formula (IV), each r and s are, independently, 0, 1, 2, 3 or 4, wherein the sum of r and s is equal to 2, 3 or 4. Preferably, each r and s are, independently, 0, 1 or 2, wherein the sum of r and s is equal to 2. More preferably, r is equal to 1 and s is equal to 1.

Examples of the isocyanate with at least 2 isocyanate groups are: toluol-2,4-diisocyanate; toluol-2,6-diisocyanate; 1,5-naphthalindiisocyanate; cumol-2,4-diisocyanate; 4-methoxy-1,3-phenyldiisocyanate; 4-chloro-1,3-phenyldiisocyanate; diphenylmethane-4,4-diisocyanate; diphenylmethane-2,4-diisocyanate; diphenylmethane-2,2-diisocyanate; 4-bromo-1,3-phenyldiisocyanate; 4-ethoxy-1,3-phenyl-diisocyanate; 2,4'-diisocyanate diphenylether; 5,6-dimethyl-1,3-phenyl-diisocyanate; methylenediphenyl diisocyanate (including 2,2'-MDI, 2,4'-MDI and 4,4"-MDI); 4,4-diisocyanato-diphenylether; 4,6-dimethyl-1,3-phenyl-diisocyanate; 9,10-anthracene-diisocyanate; 2,4,6-toluol triisocyanate; 2,4,4'-triisocyanatodiphenylether; 1,4-tetramethylene diisocyanate; 1,6-hexamethylene diisocyanate; 1,10-decamethylene-diisocyanate; 1,3-cyclohexylene diisocyanate; 4,4'-methylene-bis-(cyclohexylisocyanate); xylol diisocyanate; 1-isocyanato-3-methyl-isocyanate-3,5,5-trimethylcyclohexane (isophorone diisocyanate); 1-3-bis(isocyanato-1-methylethyl) benzol (m-TMXDI); 1,4-bis(isocyanato-1-methylethyl) benzol (p-TMXDI); oligomers or polymers of the above mentioned isocyanate compounds; or mixtures of two or more of the above mentioned isocyanate compounds or oligomers or polymers thereof. A variety of polymeric isocyanates can be used in the present invention. Suitable examples include polymers and oligomers of diphenylmethane diisocyanates (MDIs and pMDIs), toluene diisocyanates (TDIs), hexamethylene diisocyanates (HDIs), isophorone diisocyanates (IPDIs), and combinations thereof. The preferred polymeric isocyanate for use in the present invention is polymers and oligomers based on diphenylmethane diisocyanates.

Particularly preferred isocyanates with at least 2 isocyanate groups are toluol diisocyanate, methylenediphenyl diisocyanate, diphenylmethane diisocyanate, an oligomer based on toluol diisocyanate, an oligomer based on methylenediphenyl diisocyanate (poly-MDI) or an oligomer based on diphenylmethane diisocyanate and polymers thereof.

Curing Agents and Catalysts

The coatings of the invention can be cured with at least one of a variety of curing agents, including reactive, nonreactive (e.g., "catalysts") and partially reactive agents that facilitate the formation of polyurea-type linkages. Generally, the preferred curing agents are selected from the amine-based curing agents and are added to the reacting mixture of polyurea-type precursors at a total amount within the range from about 0.0001% to about 30 total wt %. The amine-based curing agents may also be used as a mixture of a fast-acting first curing agent and a second, latent curing agent if additional crosslinking ability is desired to take advantage of downhole heat and pressure conditions. Either of these first and/or second amine-based curing agents may be reactive, nonreactive or partially reactive. If the amine curing agent is reactive, however, the amine is preferably chosen to favor the formation of polyurea by reaction with the isocyanate.

Suitable single amine-based curing agent or a mixture of amine-based curing agents for promoting the formation of polyurea can include, but are not limited to, 2,2'-dimorpholinodiethyl ether; bis-dimethylaminoethylether; ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl)ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-benzene; and derivatives thereof; 1,4-bis-(sec-butylamino)-benzene; 1,2-bis-(sec-butylamino)-benzene; N,N'-dialkylamino-diphenylmethane; trimethyleneglycol-ci-p-aminobenzoate; poly-tetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-ciaminocyclohexylmethane; and mixtures thereof. In one embodiment, the amine-terminated curing agent is 4,4'-bis-(sec-butylamino)-dicyclohexylmethane. Preferred amine-based curing agents and catalysts that aid the —NCO— and water reaction to form the polyurea-type links for use with the present invention include triethylenediamine; bis(2-dimethylaminoethyl) ether; tetramethylethylenediamine; pentamethyldiethylenetriamine; 1,3,5-tris(3-(dimethylamino)propyl)-hexahydro-s-triazine and other tertiary amine products of alkyleneamines.

Additionally, other catalysts that promote the reaction of isocyanates with hydroxyls and amines that are known by the industry can be used in the present invention, e.g., transition metal catalysts of Groups III or IV used for polyurea-type foams. Particularly preferred metal catalysts include dubutyltin dilaurate and added to water for application during the coating process.

Also preferred are catalysts that promote isocyanate trimerization over other reaction mechanisms. See, e.g., U.S. Pat. No. 5,264,572 (cesium fluoride or tetraalkylammonium fluoride), U.S. Pat. No. 3,817,939 (organic carbonate salt), and U.S. Pat. No. 6,127,308 (lithium salts, lithium hydroxide, allophane catalysts such as tin-2-ethylhexanoate or tin octoate, and organic compounds containing at least one hydroxyl group), the disclosures of which are herein incorporated by reference. Phosphorous-based catalysts have been used to promote the formation of polycarbodiimides (see the examples in Tanguay et al. US 2011/0297383) and are not preferred for use in the present invention.

The amine-based curing agent may have a molecular weight of about 64 or greater. In one embodiment, the molecular weight of the amine-curing agent is about 2000 or less and is a primary or secondary amine. Tertiary amines will not generally be used as a reactant for forming polyurea-type coatings.

Of the list above, the saturated amine-based curing agents suitable for use to make polyurea-type coatings according to the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; monoisopropanolamine, diisopropanolamine; isophoronediamine; N,N'-diisopropylisophorone diamine and mixtures thereof.

In one embodiment, the curative used with the prepolymer include 3,5-dimethylthio-2,4-toluenediamine,3,5-dimethyl-thio-2,6-toluenediamine, 4,4'-bis-(sec-butylamino)-diphenylmethane, N,N'-diisopropyl-isophorone diamine; polyoxypropylene diamine; propylene oxide-based triamine; 3,3'-dimethyl-4,4'-diaminocyclohexylmethane; and mixtures thereof.

Because unhindered primary diamines result in a rapid reaction between the isocyanate groups and the amine groups, in certain instances, a hindered secondary diamine may be more suitable for use. Without being bound to any particular theory, it is believed that an amine with a high level of stearic hindrance, e.g., a tertiary butyl group on the nitrogen atom, has a slower reaction rate than an amine with no hindrance or a low level of hindrance and further adds to the hydrolytic and thermal stability of the final product. For example, 4,4'-bis-(sec-butylamino)-dicyclohexylmethane (CLEARLINK 1000® from Huntsman Corporation in The Woodlands, Tex.) may be suitable for use in combination with an isocyanate to form the polyurea-type coating. In addition, N,N'-diisopropyl-isophorone diamine, also available from Huntsman Corporation, under the tradename JEFFLINK®, may be used as the secondary diamine curing agent.

In addition, a trifunctional curing agent can be used to help improve cross-linking and, thus, to further improve the chemical and/or abrasion resistance of the coating. In one embodiment, a diethylene triamine or triethylene tetramine are both highly reactive and are desirably added to the coating process with water.

The curing agents of the present invention can be added to the coating formulation simultaneously as any of these components or pre-coated on the proppant. Preferably, the curing agent is co-applied to the solid proppant core with water at substantially the same time that isocyanate is added.

Reactive Amines or Amides

The coating formulation of the present invention also optionally includes a reactive amine or reactive amide component, preferably an amine-terminated compound or an amide to add a dual function property or modify one or more of the properties of the polyurea-type coating. The coating formulation can, however, be made effectively and with good properties in the absence or substantial absence of a reactive amine component. The reactive amine component can enhance crosslink density within the coating and, depending on component selection, can provide additional characteristics of benefit to the cured coating. Reactive amine components for use in the present invention include C1-C40 amine-terminated, amine-containing, or amide compounds such as monoamines (e.g., butyl amine), amides (e.g., fatty acid amides, stearyl amides), diamines, triamines, amine-terminated glycols such as the amine-terminated polyalkylene glycols sold commercially under the trade name JEFFAMINE from Huntsman Performance Products in The Woodlands, Tex. The use of amides can be particularly useful for enhancing flow and hydrophobic properties as well as the antimicrobial properties of the coatings. Additionally, the amine containing compound can be monofunctional as primary amines and amides, each capable of incorporating desirable properties into the coating, e.g., hydrophobic characteristics, better flow properties and antimicrobial properties.

Suitable diamines include primary, secondary and higher polyamines and amine-terminated compounds. Suitable compounds include, but are not limited to, ethylene diamine; propylenediamine; butanediamine; hexamethylenediamine; 1,2-diaminopropane; 1,4-diaminobutane; 1,3-diaminopentane; 1,6-diaminohexane; 2,5-diamino-2,5-dimethlhexane; 2,2,4- and/or 2,4,4-trimethyl-1,6-diaminohexane; 1,11-diaminodecane; 1,12-diaminododecane; 1,3- and/or 1,4-cyclohexane diamine; 1-amino-3,3,5-trimethyl-5-aminomethyl-cyclohexane; 2,4- and/or 2,6-hexahydrotoluylene diamine; 2,4' and/or 4,4'-diaminodicyclohexyl methane and 3,3'-dialkyl-4,4'-diamino-dicyclohexyl methanes such as 3,3'-dimethyl-4,4-diamino-dicyclohexyl methane and 3,3'-diethyl-4,4'-diaminodicyclohexyl methane; aromatic polyamines such as 2,4- and/or 2,6-diaminotoluene and 2,6-diaminotoluene and 2,4' and/or 4,4'-diaminodiphenyl methane; and polyoxyalkylene polyamines (also referred to herein as amine terminated polyethers).

Suitable triamines and higher multifunctional polyamines for modifying properties such as Tg, softness, and washout resistance in the present coating include diethylene triamine, triethylenetetramine, and higher homologs of this series.

JEFFAMINE diamines include the D, ED, and EDR series products. The D signifies a diamine, ED signifies a diamine with a predominately polyethylene glycol (PEG) backbone, and EDR designates a highly reactive, PEG based diamine.

JEFFAMINE D series products are amine terminated polypropylene glycols with the following representative structure:

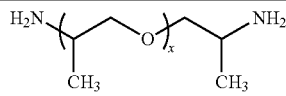

| JEFFAMINE ® | x | MW* |
|---|---|---|
| D-230 | ~2.5 | 230 |
| D-400 | ~6.1 | 430 |
| D-2000 | ~33 | 2,000 |
| D-4000 (XTJ-510) | ~68 | 4,000 |

JEFFAMINE EDR-148 (XTJ-504) and JEFFAMINE EDR-176 (XTJ-590) amines are much more reactive than the other JEFFAMINE diamines and triamines. They are represented by the following structure:

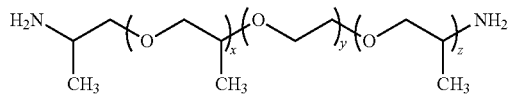

| JEFFAMINE ® | y | x + z | MW* |
|---|---|---|---|
| HK-511 | 2.0 | ~1.2 | 220 |
| ED-600 (XTJ-500) | ~9.0 | ~3.6 | 600 |
| ED-900 (XTJ-501) | ~12.5 | ~6.0 | 900 |
| ED-2003 (XTJ-502) | ~39 | ~6.0 | 2,000 |

JEFFAMINE T series products are triamines prepared by reaction of propylene oxide (PO) with a triol intiator followed by amination of the terminal hydroxyl groups. They are exemplified by the following structure:

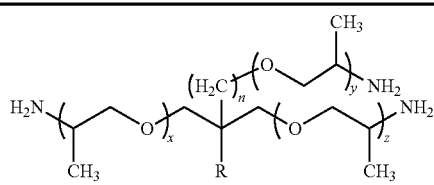

| JEFFAMINE ® | R | n | Moles PO (x + y + z) | MW* |
|---|---|---|---|---|
| T-403 | $C_2H_5$ | 1 | 5-6 | 440 |
| T-3000 (XTJ-509) | H | 0 | 50 | 3000 |
| T-5000 | H | 0 | 85 | 5000 |

The SD Series and ST Series products consist of secondary amine versions of the JEFFAMINE core products. The SD signifies a secondary diamine and ST signifies a secondary trimine. The amine end-groups are reacted with a ketone (e.g. acetone) and reduced to create hindered secondary amine end groups represented by the following terminal structure:

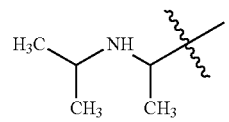

One reactive hydrogen on each end group provides for more selective reactivity and makes these secondary di- and triamines useful for intermediate synthesis and intrinsically slower reactivity compared with the primary JEFFAMINE amines.

| JEFFAMINE ® | Base Product | MW* |
|---|---|---|
| SD-231 (XTJ-584) | D-230 | 315 |
| SD-401 (XTJ-585) | D-400 | 515 |
| SD-2001 (XTJ-576) | D-2000 | 2050 |
| ST-404 (XTJ-586) | T-403 | 565 |

See also U.S. Pat. Nos. 6,093,496; 6,306,964; 5,721,315; 7,012,043; and Publication U.S. Patent Application No. 2007/0208156 the disclosures of which are hereby incorporated by reference.

Additives

The proppant coating compositions of the invention may also include various additives that change its appearance, properties, handling characteristics or performance as a proppant or in fracturing or breaker fluids. For example, the coatings of the invention may also include pigments, tints, dyes, and fillers in an amount to provide visible coloration in the coatings. Other materials include, but are not limited to, impact strength enhancers, reinforcing agents, reaction rate enhancers or catalysts, crosslinking agents, optical brighteners, propylene carbonates, coloring agents, fluorescent agents, whitening agents, UV absorbers, hindered amine light stabilizers, defoaming agents, processing aids, mica, talc, nano-fillers, silane coupling agents, anti-slip agents, water affinity or repulsion components, water-activated agents, viscosifiers, flowaids, anticaking agents, wetting agents, toughening agents such as one or more block copolymers, and components that act to remove at least some portion of the heavy metals and/or undesirable solutes found in subterranean groundwater. See, copending U.S. patent application Ser. No. 13/224,726 filed on 1 Sep. 2011 entitled "Dual Function Proppants", the disclosure of which is herein incorporated by reference.

The additives are preferably present in an amount of about 15 weight percent or less. In one embodiment, the additive is present in a non-zero amount of about 5 percent or less by weight of the coating composition. An especially preferred additives are amorphous silica (e.g., silica flour, fumed silica and silica dispersions) and silica alternatives (such as those used in sandblasting as an alternative to silica or organo-functional silane like the DYNASYLAN fluids from Evonik Degussa Corporation in Chester, Pa.) that act as anticaking agents or dispersions. Such agents or dispersions are applied to the outer surfaces of the coated proppant solid to prevent the formation of agglomerates during packing and shipping. Amorphous silica is preferably applied in an amount generally within the range from about 0.001 wt % to about 1 wt % based on the dry proppant weight.

Adhesion promoter agents can be used to increase the bond strength between the outer surface of the proppant core solid and any applied coating. Silanes are a particularly preferred type of adhesion promoter agent that improves the affinity of the coating resin for the surface of the proppant core solid and is particularly useful when sand is the proppant core. Silanes can be mixed in as additives in step (a), but can also be converted chemically with reactive constituents of the polyol component or of the isocyanate component. Functional silanes such as amino-silanes, epoxy-, aryl- or vinyl silanes are commercially available. The amino-silanes are preferred.

An optional additional additive is a contaminant removal component that will remove, sequester, chelate or otherwise clean at least one contaminant, especially dissolved or otherwise ionic forms of heavy metals and naturally occurring radioactive materials (NORMS), from subterranean water or hydrocarbon deposits within a fractured stratum while also propping open cracks in said fractured stratum. Preferably, the contaminant removal component is associated with the proppant solid as a chemically distinct solid that is introduced together with the proppant solid as: (a) an insoluble solid secured to the outer or inner surface of the proppant solid with a coating formulation that binds the solids together, (b) as a solid lodged within pores of the proppant solid or (c) as a chemical compound or moiety that is mixed into or integrated with a coating or the structure of the proppant solid. See copending U.S. patent application Ser. No. 13/224,726 filed on 2 Sep. 2011 entitled "Dual Function Proppants" the disclosure of which is herein incorporated by reference. Additional added functionality can also be in the form of fracture fluid breakers, de-emulsifiers, and bactericides.

The added functionality of an auxiliary particle to the proppant may also be in the form of an ion exchange resin that is pretreated or which itself constitutes a dissolvable solid for the slow release of corrosion or scale inhibitors. Such slow release materials could prove beneficial and advantageous to the overall operation and maintenance of the well.

Proppant Core Solids

The proppants can be virtually any small solid with an adequate crush strength and lack of chemical reactivity. Suitable examples include sand, ceramic particles (such as aluminum oxide, silicon dioxide, titanium dioxide, zinc oxide, zirconium dioxide, cerium dioxide, manganese dioxide, iron oxide, calcium oxide, magnesium oxide, or bauxite), or also other granular materials.

Proppant sands are a preferred type of proppant for the present invention. Sand is mainly used in the hydraulic fracturing process of natural gas and oil wells to increase their productivity of valuable natural resources. Proppant sand is monocrystalline with a high silica content of at least 80 wt %, and more typically has a silica content of greater than about 97 wt % silica.

The American Petroleum Institute specifications place the following limitations on sieve distribution for proppants suitable for use in hydraulic fracturing:

At least 90% of material must fall between the two mesh sizes,

No more than 10% of the material may be coarser than the largest mesh size,

No more than 0.1% of the material may be coarser than the next largest mesh size [e.g. for 20/40, up to 10% of the proppant may be between 16 and 20 mesh, but no more than 0.1% can exceed 16 mesh], and No more than 1% of material is permitted to fall onto the pan.

Proppants are divided into low-density, medium density, high-density when determined in bulk. Proppant crush strengths are divided into 52 MPa, 69 MPa, 86 MPa and 103 MPa series. The size specifications of proppant sand are generally 12-18 mesh, 12-20 mesh, 16-20 mesh, 16-30 mesh, 20-40 mesh, between 30-50 mesh, 40-60 mesh, 40-70 mesh and smaller. The proppants to be coated preferably have an average particle size within the range from about 50 μm and about 3000 μm, and more preferably within the range from about 100 μm to about 2000 μm.

Coating Method

The coating process of the present invention produces a polyurea-type coating on the proppant core solids that is hard, durable and resists dissolution under the rigorous combination of high heat, agitation, abrasion and water found downhole in a fractured subterranean formation. Preferably, the cured coating exhibits a sufficient resistance (as reflected by a 10 day autoclave test or 10 day conductivity test) so that the coating resists loss by dissolution in hot water ("LOT loss") of less than 25 wt %, more preferably less than 15 wt %, and even more preferably a loss of less than 5 wt %. The substantially cured coating of the invention thus resists dissolution in the fractured stratum while also exhibiting sufficient consolidation and resistance to flow back without the use of an added bonding activator while also exhibiting sufficiently high crush strength to prop open the fractures and maintain their conductivity for extended periods.

The temperature of the coating process is not particularly restricted outside of practical concerns for safety and component integrity. The preferred conditions for the coating/curing step of the present invention are generally at conditions within the range of about 50° to about 175° C., more preferably at a temperature within the range from about 75° C. to about 150° C., and most preferably at a temperature within the range from about 80° C. to about 135° C. As noted above, this temperature is conveniently achieved by heating or using heated proppant solids. The preferred temperature range avoids a number of emissions issues, reduces the amount of energy consumed in the coating process and also reduces the cooling time for the coated proppants for further handling and packaging.

Mixing can be carried out on a continuous or discontinuous basis in series or in several runs with a single mixer, but the specific mixer used to coat the proppants is not believed to be critical for the present invention. Suitable mixers include tumbling-type mixers, fluid beds, a pug mill mixer or an agitation mixer can be used. For example, a drum mixer, a plate-type mixer, a tubular mixer, a trough mixer or a conical mixer can be used. The easiest way is mixing in a rotating drum. As continuous mixer, a worm gear can, for example, be used.

A preferred mixer type is a tumbling-type mixer that uses a rotating drum driven by an electrical motor. The load on the motor can be used as a measure of the viscosity of the tumbling solids and the degree to which they are forming agglomerates or resinous deposits inside the mixer: the electrical load on the motor increases as the agglomeration and fouling increase. Adding water to the mixing solids or adding one or more of the polyurea precursor components in an aqueous solution, emulsion or suspension can help to reduce this load increase and retain the free-flowing nature of the mixing solids, thereby enabling even larger productivity from the mixer.

As noted above, water is preferably added to the isocyanate at a rate sufficient to form a reactive amine species which then reacts almost immediately with adjacent isocyanate to form polyurea. Preferably, water and an isocyanate-containing component are used in an amount within the range from about 5-30% water, 95-70% ISO consistent with the demands of the catalyst to promote the hydrolysis of the ISO and temperature of the substrate during the timed additions onto the proppant substrate. The water and isocyanate are added at a rate sufficient to maintain a proportion of 5-30 to 95-70 so as to promote the in-situ formation of a reactive amine component from the isocyanate which then reacts with unconverted isocyanate to make the polyurea-type coating of the present invention. These ratios also control the ultimate nature of the polyurea produced, whether driven to pre-cured, or controlled to retain a level of curability.

Most of the components for the coating are preferably added along with either the water or the isocyanate to facilitate proper mixing and metering of the components. A silane adhesion promoter is added to the heated sand. A colorant is added during the coating process by an injection line into the coating mixer. A surfactant and/or flow aid can be added after the proppants have been coated to enhance wettability and enhanced flow properties with lower fines generation, respectively.

The method for the production of coated proppants according to the present invention can be implemented without the use of solvents. Accordingly, the mixture obtained in step (a) in one embodiment of the method is solvent-free, or is essentially solvent-free. The mixture is essentially solvent-free, if it contains less than 20 wt %, preferably less than 10 wt %, more preferably less than 5 wt %, and still more preferably less than 3 wt %, and most preferably less than 1 wt % of solvent, relative to the total mass of components of the mixture.

The coating is preferably performed at the same time as the curing of the coating on the proppant. In the present invention, the coated proppant becomes free-flowing at a time of less than 5 minutes, preferably within the range of 1-4 minutes, more preferably within the range of 1-3 minutes, and most preferably within the range of 1-2 minutes to form a coated, substantially cured, free-flowing, coated proppant. This short cycle time combines with the relatively moderate coating temperatures to form a coating/curing process that provides lower energy costs, smaller equipment, reduced emissions from the process and the associated scrubbing equipment, and overall increased production for the coating facility.

The coating material or combinations of different coating materials may be applied in more than one layer. For example, the coating process may be repeated as necessary (e.g. 1-5 times, 2-4 times or 2-3 times) to obtain the desired coating thickness.

Alternatively, the polyurea-type coating of the present invention can be applied as the outermost layer over, e.g., a precured or curable phenolic coating, to take advantage of the underlying crush resistance and other properties of the phenolic coating while adding the bonding ability of the present polyurea-type coating. Such an outer coating would avoid the need for an added activator or surfactant compounds that are typically required for the phenolic coatings and thereby also avoid the potential for chemical incompatibility or interference with the formulated fracturing or breaker fluids used in hydraulic well fracturing. A typical size range for the final, coated proppant is desirably within the range of about 16 to about 100 mesh.

The polyurea-type coating of the present invention can also be applied to a polyurethane coated proppant or formed in situ as what is believed to be an outermost "skin" layer. This skin layer of polyurea-type coating reduces any residual surface tackiness or unreacted moieties remaining after the urethane-forming reactions and enhances the free-flow properties of the resulting proppant. This skin is formed by waiting until less than 20%, preferably less than 10% of the time remaining in the coating and curing process remains before adding water to the process on our copending U.S. patent application Ser. No. 13/355,969 filed on 23 Jan. 2012 entitled "Manufacture of Polymer Coated Proppants", the disclosure of which is hereby incorporated by reference. The amount of added water should be small, less than 10 wt %, preferably less than 5 wt % of the total proppant mixture and just enough to maintain a free-flowing mixture without forming a slurry. The small amount of water is believed to encourage remaining unreacted isocyanate moieties to react and form a polyurea-type skin coating on the surface of the hybrid polyurethane-polyurea proppant.

Similarly, utilizing the high reactivity of this polyurea system, a polyurea can be formed as the basecoat, followed by a topcoat of a phenolic, or epoxy, polyurethane or other coating.

The amount of coating resin, that is, of the polyurea resin applied to a proppant, is preferably between about 0.5 and about 10 wt %, more preferably between about 1% and about 5 wt %, resin relative to the mass of the proppant as 100 wt %. With the method according to the present invention proppants can be coated at temperatures between about 50° C. and about 175° C., preferably within the range of about 75°-125° C. and preferably in a solvent-free manner.

The coating process requires a comparatively little equipment and if necessary can also be carried out near the sand or ceramic substrate source, near the geographically location of the producing field or at/near the well itself.

The coated proppants can additionally be treated with surface-active agents, anticaking agents, or auxiliaries, such as talcum powder or stearate or other processing aids such as fine amorphous silica to improve pourability, wettability (even to the extent that a water wetting surfactant can be eliminated), dispersability, reduced static charge, dusting tendencies and storage properties of the coated product.

If desired and by no means is it required, the coated proppants can be baked or heated for a period of time sufficient to further enhance the ultimate performance of the coated particles and further react the available isocyanate, hydroxyl and reactive amine groups that might remain in the coated proppant. Such a post-coating cure may occur even if additional contact time with a catalyst is used after a first coating layer or between layers. Typically, the post-coating cure step is performed like a baking step at a temperature within the range from about 100°-200° C. for a time of about 1 minute to 4 hours, preferably the temperature is about 125°-200° C. for about 1-30 minutes.

Even more preferably, the coated proppant is cured for a time and under conditions sufficient to produce a coated proppant that exhibits a loss of coating of less than 25 wt %, preferably less than 15 wt %, and even more preferably less than 5 wt % when tested according to simulated downhole conditions under ISO 13503-5:2006(E). Even more preferably, the coated proppant of the present invention exhibits the low dust and handling characteristics of a conventional pre-cured proppant (see API RP 60) but also exhibits a crush test result at 10,000 psi of less than 10%, more preferably less than 5%, and especially less than 2%. The coated proppants of the invention preferably also have an unconfined compressive strength of greater than 20 psi and more preferably more than 500 psi with a fracture conductivity at a given closure stress that is substantially equal to, or greater than, the conductivity of a phenolic coating used in the same product application range.

Using the Coated Proppants

The invention also includes the use of the coated proppants in conjunction with a fracturing liquid to increase the production of petroleum or natural gas. Techniques for fracturing an unconsolidated formation that include injection of consolidating fluids are also well known in the art. See U.S. Pat. No. 6,732,800 the disclosure of which is herein incorporated by reference. Generally speaking, a fluid is injected through the wellbore into the formation at a pressure less than the fracturing pressure of the formation. The volume of consolidating fluid to be injected into the formation is a function of the formation pore volume to be treated and the ability of the consolidating fluid to penetrate the formation and can be readily determined by one of ordinary skill in the art. As a guideline, the formation volume to be treated relates to the height of the desired treated zone and the desired depth of penetration, and the depth of penetration is preferably at least about 30 cm radially into the formation. Please note that since the consolidation fluid is injected through the perforations, the treated zone actually stems from the aligned perforations.

Before consolidating the formation, according to a preferred embodiment, an acid treatment is performed by injection of an acidic fluid. As it is well known in the art, this acidic treatment typically includes several stages such as an acid preflush, one or more stages of acid injection and an overflush.

After the perforation and the consolidation, the final step is the fracturing step. Although a resin treatment alone may have been sufficient in preventing early sand production the resin reduces the permeability of the formation around the wellbore. The primary purpose of the fracture treatment is to connect the wellbore to the formation and in doing so bypass any damage and act as a filter allowing the production of hydrocarbons while holding back formation material. The high surface area associated with a fracture makes it a very effective filter, for example, a 13.7 m fracture length with 25 cm height has a surface area of 368 $m^2$, compared to the open hole flow area for a gravel pack of 3.2 $m^2$ with the same zone height.

Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. In order to maintain the fractures formed in the formation after the release of the fluid pressure, the fracturing fluid carries a proppant whose purpose is to prevent the fracturing from closing after pumping has been completed.

The fracturing liquid is not particularly restricted and can be selected from among the fracturing liquids known in the specific field. Suitable fracturing liquids are described, for example, in W C Lyons, G J Plisga, "Standard Handbook Of Petroleum And Natural Gas Engineering," Gulf Professional Publishing (2005). The fracturing liquid can be, for example, water gelled with polymers, an oil-in-water emulsion gelled with polymers, or a water-in-oil emulsion gelled with polymers. In one preferred embodiment, the fracturing liquid comprises the following constituents in the indicated proportions: 1000 l water, 20 kg potassium chloride, 0.120 kg sodium acetate, 3.6 kg guar gum (water-soluble polymer), sodium hydroxide (as needed) to adjust a pH-value from 9 to 11, 0.120 kg sodium thiosulfate, 0.180 kg ammonium persulfate and optionally a crosslinker such as sodium borate or a combination of sodium borate and boric acid to enhance viscosity.

In addition, the invention relates to a method for the production of petroleum or natural gas which comprises the injection of the coated proppant into the fractured stratum with the fracturing liquid, i.e., the injection of a fracturing liquid which contains the coated proppant, into a petroleum- or natural gas-bearing rock layer, and/or its introduction into a fracture in the rock layer bearing petroleum or natural gas. The method is not particularly restricted and can be implemented in the manner known in the specific field. The concentration of proppant in the fracturing fluid can be any concentration known in the art, and will typically be in the range of about 0.5 to about 20 pounds of proppant added per gallon of clean fluid.

The fracturing fluid can contain an added proppant-retention agent, e.g. a fibrous material, a curable resin coated on the proppant, platelets, deformable particles, or a sticky proppant coating to trap proppant particles in the fracture and prevent their production through the wellbore. Fibers, in concentration that preferably ranges from about 0.1% to about 5.0% by weight of proppant, for example selected from natural organic fibers, synthetic organic fibers, glass fibers, carbon fibers, ceramic fibers, inorganic fibers, metal fibers and mixtures thereof, in combination with curable resin-coated proppants are particularly preferred. The proppant-retention agent is intended to keep proppant solids in the fracture, and the proppant and proppant-retention agent keep formation particles from being produced back out from the well in a process known as "flowback."

EXAMPLES

Example 1

Polyurea Coating Process

The process for making a polyurea-type coating according to the invention reflects the preparation of the base polyurea using a catalyst in an aqueous solution with specific time and order of addition and a temperature that is chosen to result in a polyurea-type coating that is suitable for use as a high temperature, high pressure proppant coating that is resistant to loss at typical downhole conditions found in high temperature wells. Using the cycle described in this example and shown in Table 1, the coating weight can be increased by simply increasing the amounts of the total chemicals while working with this ratio. Proppants having 2.1%, 3.1%, and 3.7 wt % coatings have been prepared using this method.

TABLE 1

| Step | Event |
|---|---|
| 1) | 2000 g of 20/40 northern white sand is heated to 206° F. (97° C.) and placed in a lab mixer with good, continuous mixing. Mixing continues throughout the coating process. |
| 2) | The clock is started (T = 0), and 2 g of 3-aminopropyl triethoxy silane (a silane coupling agent) is added to enhance bonding between the sand and coating. |
| 3) | At T = 10 seconds, the addition of 66.2 g of a liquid polymeric isocyanate (polyMDI) (31.1% NCO) begins. This addition will end at T = 80 seconds. |
| 4) | Also at T = 10 secs, 24 g of a 12% aqueous solution of a curing agent, such as blowing catalyst bis-dimethylaminoethylether, begins. The addition of this component also ends at T = 80 seconds. |
| 5) | At T = 140 seconds, the free-flowing, fully coated, individual grains of coated proppant are discharged from the mixer and characterized. The coating is a thin, glassy film of substantially fully cured coating that is hard, nontacky, and substantially foam-free. |

The characterization of coated sands will normally include the resin coat weight (as measured by loss on ignition ("LOI") tests, % of total weight), crush resistance, bond strength, and TMA analysis. For example, the coated proppants of Example 1 tested at 3.1 wt % coating shows only thermal expansion in the TMA (up to 240° C.), thereby suggesting that its glass transition temperature (Tg) is about 240° C.). When tested for unconfined compressive strength ("UCS") at 250° F. (121° C.), the coated proppant exhibited a bond strength of 350 psi and a 10,000 psi crush failure of 3.1%. These are all promising results as the coating Tg for high temperature wells is most preferably within the range of about 200-265° C. and exhibits a bond strength in UCS testing of at least 20 psi, more preferably at least 100 psi and most preferably a bond strength within the range of 250-2000 psi after 24 hours of compression stress at 1000 psi and 250° F. Not only should the interparticle bond strength of the coated proppants fall within these ranges during the UCS testing, but the interparticle bond strength should be retained after multiple heating-cooling cycles to reflect maintained and durable conductivity.

The conductivity testing of this material was encouraging as it was essentially equal to that of an existing, commercial grade, phenolic resin-coated, white sand but without the need to add an activator or surfactant compound that is often used with phenolic coatings to encourage the development of bond strength but at the possible compromise of fracturing and/or breaker fluid compatibility.

Example 2

Polyurea with B Stage Curing

The approach of Example 2 incorporates a delayed, b-stage cure ability into the polyurea-type coating. This coating, much like that of Example 1, is formed as it is applied by the simultaneous addition and reaction, represented according to the sequence shown below in Table 2.

TABLE 2

| Step | Event |
|---|---|
| 1) | 2000 g of 20/40 northern white sand is heated to 204° F. (97° C.) and placed in a lab mixer with good, continuous mixing. Continuous mixing was performed throughout the coating process. |
| 2) | The clock is started (T = 0), and 2 g of a silane coupling agent (3-aminopropyl triethoxy silane) is added. |
| 3) | At T = 10 seconds, the addition of 79.2 g of a polymeric isocyanate (liquid polyMDI) (31.1% NCO) begins and ends at T = 100 seconds. |
| 4) | Also at T = 10 seconds, 28.8 g of a 12% aqueous solution of a curing agent such as blowing catalyst bis-dimethylaminoethylether, begins and ends at T = 100 seconds. |
| 5) | At T = 100 seconds, 8 g of 40% aqueous hexamethylenetetramine (a B-stage crosslinking agent) begins and ends at T = 135 seconds. |
| 6) | At T = 180 seconds, the free-flowing, fully coated, individual grains are discharged from the mixer and characterized. The coating is a thin film of polyurea that is hard and substantially foam-free. |

As with Example 1, the characterization of coated sands will normally include the resin coating weight as determined by LOI, the crush resistance, bond strength, and TMA analysis where we look into the response of the coated particles to increasing temperatures. For example, the sample produced in Example 2 tested at 3.55 wt % LOI, shows only thermal expansion in the TMA (up to 240° C.), but exhibited a 250° F. (121° C.) UCS bond strength of 606 psi, with a 10,000 psi crush failure of 13%. Conductivity testing of this material was not determined.

The existence of secondary curing potential ("B stage curing") is implied by the presence of additional reactivity and curing behavior that occurs during the test for UCS.

Once those skilled in the art are taught the invention, many variations and modifications are possible without departing from the inventive concepts disclosed herein. The invention, therefore, is not to be restricted except in the spirit of the appended claims.

What is claimed:
1. A method for the production of proppant that is coated with a substantially cured, polyurea-type coating, the method comprising:
  forming a thin, glassy film of said polyurea-type coating on a heated proppant core solid, having a size range of about 16 to about 100 mesh, by contacting said core simultaneously with:
  (a) an isocyanate comprising at least 2 reactive isocyanate groups; and

(b) a mixture of water and a curing agent and/or catalyst in amounts sufficient to promote the formation of said thin, glass film, substantially cured, polyurea-type coating, wherein said water is contacted with said isocyanate at a rate sufficient to form a reactive amine that then reacts with additional isocyanate to form said polyurea-type coating on said proppant and wherein the proppant core solid, water and isocyanate are added a rate sufficient to maintain a proportion of 5-30 wt % water to 95-70% isocyanate, and wherein said coating exhibits an interparticle bond strength of at least 20 psi in unconfined compressive strength testing.

2. A method according to claim 1, wherein said proppant core solid comprises sized sand or ceramic.

3. A method according to claim 1, wherein said isocyanate comprises a polymer or an oligomer of an isocyanate.

4. A method according to claim 1, wherein said catalyst comprises bis-dimethylaminoethylether or bis-morpholinium diethylether.

5. A method according to claim 1, wherein the polyurea-type coating made by said method exhibits an interparticle bond strength of at least 100 psi in unconfined compressive strength testing.

6. A method according to claim 1, wherein said heated proppant core solid has been preheated to a temperature within the range of 50-175° C.

7. A method according to claim 6 wherein said proppant core solid has been heated to a temperature within the range of 75-125° C.

8. A method according to claim 1 wherein said polyurea-type coating is present on said proppant within the range of 1-5 wt % based on total weight of coated proppant.

9. A method according to claim 1, wherein said method further comprises contacting said the heated proppant core solid with a silane adhesion promoter before contact with said isocyanate or said mixture.

10. A method according to claim 1, wherein said coating exhibits an interparticle bond strength of at least 20 psi in unconfined compressive strength testing.

11. The method according to claim 1, wherein the coating is substantially foam-free.

12. The method according to claim 1, wherein the coating is foam-free.

13. A method according to claim 1, wherein said polyurea-type coating is disposed on an outermost skin layer on a polyurethane-coated proppant core solid.

14. A method according to claim 1, wherein said polyurea-type coating is disposed on an outermost skin layer on a phenolic-resin-coated proppant core solid.

15. A method according to claim 1, wherein said polyurea-type coating is cross-linked.

* * * * *